(12) United States Patent
Shurling et al.

(10) Patent No.: US 11,414,530 B2
(45) Date of Patent: Aug. 16, 2022

(54) KAOLIN-FILLED POLYMERIC COMPOSITIONS

(71) Applicant: Burgess Pigment Company, Sandersville, GA (US)

(72) Inventors: Dickey S. Shurling, Sandersville, GA (US); Bradley S. Courson, Sandersville, GA (US); Christopher K. Smith, Harrison, GA (US); Christopher J. Fagouri, Tennille, GA (US); Ronald C. Jones, Sandersville, GA (US)

(73) Assignee: Burgess Pigment Company, Sandersville, GA (US)

( * ) Notice: Subject to any disclaimer, the term of this patent is extended or adjusted under 35 U.S.C. 154(b) by 0 days.

(21) Appl. No.: 17/373,293

(22) Filed: Jul. 12, 2021

(65) Prior Publication Data

US 2022/0010095 A1    Jan. 13, 2022

Related U.S. Application Data

(60) Provisional application No. 63/050,590, filed on Jul. 10, 2020.

(51) Int. Cl.
| | |
|---|---|
| *C08K 3/34* | (2006.01) |
| *C08K 9/06* | (2006.01) |
| *C08J 3/20* | (2006.01) |
| *B29C 48/00* | (2019.01) |
| *B29K 509/00* | (2006.01) |
| *B29K 105/16* | (2006.01) |
| *B29L 31/00* | (2006.01) |
| *B29K 23/00* | (2006.01) |
| *B29K 101/12* | (2006.01) |
| *B29C 51/00* | (2006.01) |

(52) U.S. Cl.
CPC ............... *C08K 3/346* (2013.01); *C08J 3/203* (2013.01); *C08K 9/06* (2013.01); *B29C 48/022* (2019.02); *B29C 51/002* (2013.01); *B29K 2023/16* (2013.01); *B29K 2101/12* (2013.01); *B29K 2105/16* (2013.01); *B29K 2509/00* (2013.01); *B29L 2031/7132* (2013.01); *B29L 2031/7164* (2013.01); *C08K 2201/003* (2013.01); *C08K 2201/005* (2013.01); *C08K 2201/016* (2013.01)

(58) Field of Classification Search
CPC .... C08K 3/336; C08K 9/06; C08K 2201/003; C08K 2201/005; C08K 2201/016; C08J 3/203; B29C 48/022
See application file for complete search history.

(56) References Cited

U.S. PATENT DOCUMENTS

2007/0186817 A1    8/2007   Valadares et al.

FOREIGN PATENT DOCUMENTS

| WO | 2003022933 A2 | 3/2003 |
| WO | 2006/033980 | 3/2006 |
| WO | 2017059430 A1 | 4/2017 |
| WO | 2018151837 A1 | 8/2018 |
| WO | 2018187638 A1 | 10/2018 |

OTHER PUBLICATIONS

ASTM D790-17, Standard Test Methods for Flexural Properties of Unreinforced and Reinforced Plastics and Electrical Insulating Materials, ASTM International, West Conshohocken, PA, 2017, 12 pages.
ASTM D648-16, Standard Test Method for Deflection Temperature of Plastics Under Flexural Load in the Edgewise Position, ASTM International, West Conshohocken, PA, 2018, 14 pages.
ASTM D638-14, Standard Test Method for Tensile Properties of Plastics, ASTM International, West Conshohocken, PA, 2014, 17 pages.
ASTM D281-12 (2016), Standard Test Method for Oil Absorption of Pigments by Spatula Rub-out, ASTM International, West Conshohocken, PA, 2016, 2 pages.
ASTM D1238-13, Standard Test Method for Melt Flow Rates of Thermoplastics by Extrusion Plastometer, ASTM International, West Conshohocken, PA, 2013, 16 pages.
ASTM D412-16 (2021), Standard Test Methods for Vulcanized Rubber and Thermoplastic Elastomers—Tension, ASTM International, West Conshohocken, PA, 2021, 14 pages.
ASTM D256-10e1 (2018), Standard Test Methods for Determining the Izod Pendulum Impact Resistance of Plastics, ASTM International, West Conshohocken, PA, 2018, 20 pages.
Mariano Xanthos, "Functional Fillers for Plastics" pp. 232-235.
Harry Katz, "Handbook for Fillers for Plastics", p. 155.
International Report and Written Opinion issued in PCT/US2021/041281, dated Oct. 20, 2021, 13 pages.

*Primary Examiner* — Edward J Cain
(74) *Attorney, Agent, or Firm* — Meunier Carlin & Curfman LLC

(57) ABSTRACT

Described herein are polymeric composites that can include a kaolin filler dispersed within a thermoplastic polymer matrix. The kaolin filler can exhibit an aspect ratio of from 20 to 50, as measured by laser scattering, a mean particle size of from 0.75 microns to 2 microns e.s.d., as measured by Sedigraph, or a combination thereof. In some embodiments, the kaolin filler exhibits a ratio of aspect ratio to mean particle size ranges from 4 to 5, as measured by laser scattering. In some embodiments, less than 30% by weight of the kaolin filler exhibits a particle size of less than 0.5 microns e.s.d., as measured by Sedigraph. The composites can exhibit improved mechanical properties such as flexural strength, tensile strength, and heat deflection temperature. The composites can be used to form articles, for example, by thermoforming.

24 Claims, 6 Drawing Sheets

KAOLIN-FILLED POLYMERIC COMPOSITIONS

CROSS-REFERENCE TO RELATED APPLICATIONS

This application claims benefit of priority of U.S. Provisional Application No. 63/050,590, filed Jul. 10, 2020, which is hereby incorporated by reference in its entirety.

BACKGROUND

Kaolin is an extremely versatile white functional filler, with applications in paper coating, paper filling, paints, plastics, rubber, inks, pharmaceuticals, cracking catalysts, and ceramics. The plastics and adhesives industries consume some 65,000 tons of kaolin in the U.S. per year. Kaolin is used extensively to enhance the performance of a wide range of polymers. Kaolin is especially useful in the plastics and rubber industries, where they improve adhesion and dispersion and act more effectively as functional fillers. However, there remains a need for mineral fillers such as kaolin that can enhance the mechanical properties of polymers.

SUMMARY

Described herein are polymeric compositions that include a kaolin filler dispersed within a polymer matrix. The kaolin filler can exhibit particular particle size characteristics—including a particle shape, an average particle size, and a particle size distribution—which provides filled polymeric composites having improved mechanical properties (e.g., improved flexural strength, improved tensile strength, improved heat deflection temperature, improved break stress, or a combination thereof).

In some embodiments, the kaolin filler can exhibit a ratio of aspect ratio to mean particle size, as measured by laser scattering, of from 4 to 5 (e.g., from 4.25 to 4.75, from 4.10 to 4.5, from 4.15 to 4.30, from 4.20 to 4.50, from 4.3 to 4.5, from 4.5 to 4.7, from 4.6 to 4.8, or from 4.7 to 4.9).

In some embodiments, the kaolin filler can exhibit a mean particle size of from 0.75 microns to 2 microns e.s.d. (e.g., from 1 micron to 1.5 microns e.s.d., or from 1.2 micron to 1.8 microns e.s.d.), as measured by Sedigraph.

In some embodiments, the kaolin filler can exhibit an aspect ratio of from 20 to 50 (e.g., from 20 to 30, or from 30 to 40), as measured by laser scattering.

In some embodiments, less than 30% by weight (e.g., less than 25% less than 20% by weight, less than 15% by weight, less than 10%, or less than 5% by weight) of the kaolin filler can exhibit a particle size of less than 0.5 microns e.s.d., as measured by Sedigraph.

In some embodiments, the kaolin filler can have an average circumference of less than 20 microns (e.g., less than 17 microns, less than 15 microns, or less than 10 microns), as measured by scanning electron microscope (SEM).

In some embodiments, the kaolin filler exhibits a mean radius diameter volume calculation measurement of from 50 $\mu m^3$ to 65 $\mu m^3$ for D10 and from 175 $\mu m^3$ to 200 $\mu m^3$ for D90, as determined using particle shape imaging analysis. In some embodiments, the kaolin filler exhibits a mean radius diameter volume calculation measurement of from 50 $\mu m^3$ to 65 $\mu m^3$ for D10 and from 175 $\mu m^3$ to 225 $\mu m^3$ for D90, as determined using particle shape imaging analysis. In some embodiments, 80% by weight (e.g., 85% by weight, or 90% by weight) of the kaolin filler exhibits a volume of from 50 $\mu m^3$ to 225 $\mu m^3$, as determined by particle shape imaging analysis. In some embodiments, 80% by weight (e.g., 85% by weight, or 90% by weight) of the kaolin filler exhibits a volume of from 50 $\mu m^3$ to 200 $\mu m^3$, as determined by particle shape imaging analysis.

The kaolin filler can comprise a delaminated kaolin filler. In some embodiments, the filler can be present in the composition in an amount of from 5% by weight to 70% by weight based on the total weight of the composition. If desired, the kaolin filler can be treated with a compatibilizer (e.g., to improve dispersion of the kaolin filler within the polymer matrix). In some examples, the compatibilizer can be a reactive silane (e.g., amino silane, a vinyl silane, an epoxy silane, a mercapto silane, or a combination thereof), a non-reactive silane (e.g., as alkyl silane, a phenyl silane, or a combination thereof), or a combination thereof. Compatibilizers such as calcium stearate, zinc stearate, stearic acid and other compatibilizers can be used to aid the dispersion of the clay in polymers. Samples with kaolin at loadings >40% can be treated with a compatibilizer like calcium stearate to aid in the incorporation of the mineral during twin screw extrusion. This can keep the pressures down during extrusion and improve dispersion of the clay in the polymer.

In some embodiments, the polymer matrix can comprise a thermoplastic polymer, such as a polyolefin, a polystyrene, a polydiene, a styrene butadiene copolymer, a polyurethane, a polyester, a polycarbonate, a polyacrylonitrile, a polyamide, a styrenic block copolymer, an ethylene vinyl alcohol copolymer, an ethylene vinyl acetate copolymer, a polyester grafted with maleic anhydride, a polyvinylidene chloride, an aliphatic polyketone, liquid crystalline polymer, an ethylene methyl acrylate copolymer, an ethylene-norbornene copolymer, a polymethylpentene and ethylene acrylic acid copolymer, a blends thereof, or a copolymer thereof. In some embodiments, the polymer matrix can comprise a polyolefin, such as polypropylene, polyethylene, copolymers thereof, or blends thereof. In some embodiments, the polymer matrix can comprise a polyamide, such as nylon 6,6, nylon 6, copolymers thereof, or blends thereof. In some embodiments, the polymer matrix can comprise a rubber, such as an ethylene propylene diene monomer rubber.

In some embodiments wherein the polymeric matrix comprises a polyolefin (e.g., polypropylene), the polymeric composition can exhibit a tensile strength ranging from 2000 psi to less than 5000 psi, measured according to the standard method described in ASTM D638-14.

In some embodiments wherein the polymeric matrix comprises a polyolefin (e.g., polypropylene), the polymeric composition filled with a kaolin described herein can exhibit a break stress that is at least 5% (e.g., at least 10%, at least 15%, at least 20%, at least 25%, at least 30%, at least 35%, or at least 40%) greater than the break stress of an otherwise identical polymeric composition prepared with a conventional talc filler.

In some embodiments wherein the polymeric matrix comprises a polyolefin (e.g., polypropylene), the polymeric composition filled with a kaolin described herein can exhibit a heat deflection temperature ranging from 60° C. to less than 100° C. measured according to the standard method described in ASTM D648-18. In some embodiments wherein the polymeric matrix comprises a polyolefin (e.g., polypropylene), the polymeric composition filled with a kaolin described herein can exhibit a heat deflection temperature that is greater than the heat deflection temperature of an otherwise identical polymeric composition prepared with a conventional talc filler. In some embodiments wherein the polymeric matrix comprises a polyolefin (e.g., polypropylene), the polymeric composition filled with a kaolin described herein can exhibit a heat deflection temperature that greater than the heat deflection temperature of an otherwise identical polymeric composition prepared with a conventional anhydrous kaolin filler (e.g., kaolin available under the tradename ICEBERG® from Burgess Pigment).

In some embodiments wherein the polymeric matrix comprises a polyolefin (e.g., polypropylene), the polymeric composition can exhibit a flexural strength of from 3500 psi to less than 5500 psi measured according to the standard method described in ASTM D790-17. In some embodiments wherein the polymeric matrix comprises a polyolefin (e.g., polypropylene), the polymeric composition filled with a kaolin described herein can exhibit a flexural strength that is at least 5% (e.g., at least 10%, or at least 15%) greater than the flexural strength of an otherwise identical polymeric composition prepared with a conventional talc filler.

In some embodiments wherein the polymeric matrix comprises a polyamide (e.g., nylon 6,6, nylon 6, copolymers thereof, or blends thereof), the polymeric composition can exhibit a tensile strength ranging from 8000 psi to less than 15000 psi, measured according to the standard method described in ASTM D638-14. In some embodiments wherein the polymeric matrix comprises a polyamide (e.g., nylon 6,6, nylon 6, copolymers thereof, or blends thereof), the polymeric composition can exhibit a tensile strength ranging from 8000 psi to less than 13000 psi, measured according to the standard method described in ASTM D638-14.

In some embodiments wherein the polymeric matrix comprises a polyamide (e.g., nylon 6,6, nylon 6, copolymers thereof, or blends thereof), the polymeric composition filled with a kaolin described herein can exhibit a break stress that is at least 5% (e.g., at least 10%, at least 15%, at least 20%, at least 25%, at least 30%, at least 35%, or at least 40%) greater than the break stress of an otherwise identical polymeric composition prepared with a conventional anhydrous kaolin filler.

In some embodiments wherein the polymeric matrix comprises a polyamide (e.g., nylon 6,6, nylon 6, copolymers thereof, or blends thereof), the polymeric composition filled with a kaolin described herein can exhibit a heat deflection temperature ranging from 80° C. to less than 200° C. measured according to the standard method described in ASTM D648-18. In some embodiments wherein the polymeric matrix comprises a polyamide (e.g., nylon 6,6, nylon 6, copolymers thereof, or blends thereof), the polymeric composition filled with a kaolin described herein can exhibit a heat deflection temperature that is at least 5% (e.g., at least 10%, or at least 15%) greater than the heat deflection temperature of an otherwise identical polymeric composition prepared with a conventional anhydrous kaolin filler.

In some embodiments wherein the polymeric matrix comprises a polyamide (e.g., nylon 6,6, nylon 6, copolymers thereof, or blends thereof), the polymeric composition can exhibit a flexural strength of from 9500 psi to less than 12000 psi (e.g., from 9500 psi to less than 11500 psi, or from 9500 psi to less than 11200 psi) measured according to the standard method described in ASTM D790-17.

In some embodiments wherein the polymeric matrix comprises a polyamide (e.g., nylon 6,6, nylon 6, copolymers thereof, or blends thereof), the polymeric composition filled with a kaolin described herein can exhibit a flexural strength that is within 10% of the flexural strength of an otherwise identical polymeric composition prepared with a conventional talc filler (e.g., within 5% of the flexural strength, greater than the flexural strength, at least 5% greater than the flexural strength, at least 10% greater than the flexural strength, or at least 15% greater than the flexural strength). In some embodiments wherein the polymeric matrix comprises a polyamide (e.g., nylon 6,6, nylon 6, copolymers thereof, or blends thereof), the polymeric composition filled with a kaolin described herein can exhibit a flexural strength that is within 10% of the flexural strength of an otherwise identical polymeric composition prepared with a conventional anhydrous kaolin filler (e.g., ICEBERG available from Burgess Pigment) (e.g., within 5% of the flexural strength, greater than the flexural strength, at least 5% greater than the flexural strength, at least 10% greater than the flexural strength, or at least 15% greater than the flexural strength).

Also described herein are methods of making filled polymeric compositions. These methods can comprise dispersing a kaolin filler described herein within a polymer matrix. In some embodiments, dispersing the kaolin filler within the polymer matrix includes extruding the kaolin filler and the thermoplastic polymer. In some embodiments, the method further includes forming an article from the composition. In some embodiments, forming the article includes a melt-processing technique selected from the group consisting of extrusion, compression molding, blow molding, injection molding, and injection blow molding. In some embodiments, forming the article includes thermoforming. In some embodiments, the article formed from the composition is selected from the group consisting of a cup, plate, bowl, platter, bottle, container, lid, tray, blister, clamshell, bag, sleeve, or combination thereof.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
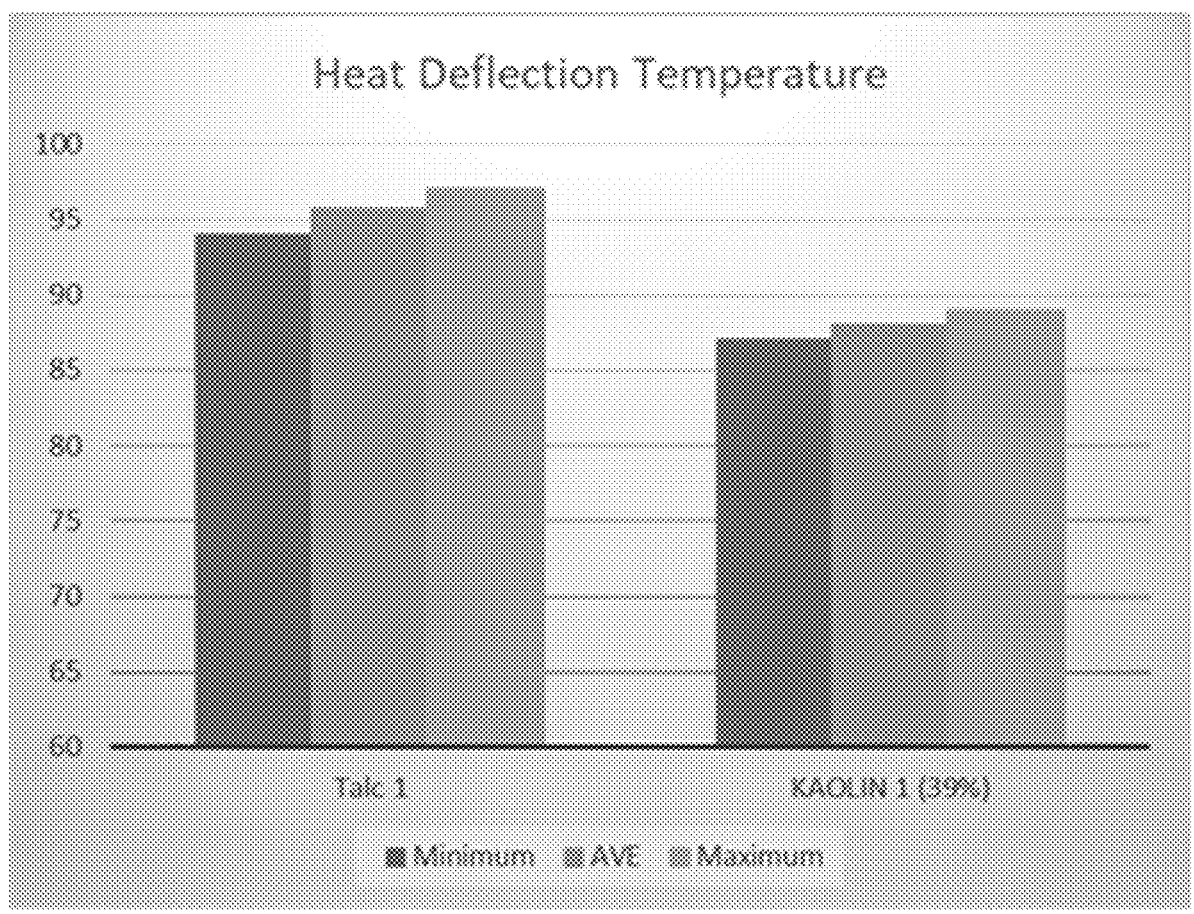
FIG. 1 is a bar graph comparing heat deflection temperature (HDT) of composites formed using 40 wt % talc in polypropylene and 40 wt % Kaolin 1 in polypropylene.

A number of embodiments of the disclosure have been described. Nevertheless, it will be understood that various modifications may be made without departing from the spirit and scope of the invention. Accordingly, other embodiments are within the scope of the following claims.

Definitions

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. Throughout the description and claims of this specification the word "comprise" and other forms of the word, such as "comprising" and "comprises," means including but not limited to, and is not intended to exclude, for example, other additives, components, integers, or steps.

As used in the specification and claims, the singular form "a", "an", and "the" include plural references unless the context clearly dictates otherwise. For example, the term "an agent" includes a plurality of agents, including mixtures thereof.

As used herein, the terms "may," "optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Unless otherwise noted, the physical properties of filled polymeric compositions (e.g., flexural strength, tensile strength, etc.) are reported for compositions containing 40% by weight filler).

Unless otherwise stated, particle size properties referred to herein for the inorganic particulate materials are as measured in a well known manner by sedimentation of the particulate material in a fully dispersed condition in an aqueous medium using a Sedigraph 5100 machine as supplied by Micromeritics Instruments Corporation, Norcross, Ga., USA (www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size (D50) is the value determined in this way of the particle e.s.d at which there are 50% by weight of the particles which have an equivalent spherical diameter less than that D50 value.

Aspect ratio can be determined by laser scattering methods using an algorithm which looks at the smallest particles or a range and uses this as those particles that are moving across edgewise across the laser. The larger particles moving across the laser are the faces of the particles. The ratio of L/W is used (face/edge) and this is the reported aspect ratio.

The term "kaolin" is used to describe a naturally occurring clay material composed primarily of the mineral kaolinite with the empirical formula $Al_2O_3.2SiO_2.2H_2O$. Refined hydrous kaolin is comprised of approximately 37% alumina, 45% silica, and 14% crystalline bound water, allowing up to 4% for other trace minerals such as oxides of iron, titanium, and potassium. The morphology of these hydrous aluminum silicate crystals gives rise to stacked hexagonal platelets, which range in size from less than 1 micron up to 10 microns. Each individual platelet consists of a tetrahedral silica ring bound by oxygen linkages to an alumina octahedral sheet, with an adequate number of hydroxyl groups rendering it hydrophilic.

"Anhydrous Kaolin" results from heat treating (calcining) "raw" or "hydrous" kaolin to a metakaolin state where the crystal structure water is released resulting in an amorphous material and can be heated further beyond the rapid crystallization of gamma-$Al_2O_3$ (mullite formation) if desired. Anhydrous kaolin as used herein includes either partially calcined to produce metakaolin, fully calcined to produce fully calcined kaolin, or rapidly calcined to produce flash calcined kaolin. Calcination begins with exposure of hydrous feedstock to temperatures starting at approximately 650° C. where surface hydroxyls are driven off to form liquid water vapor. At temperatures between 750° C. and 1100° C., kaolinite particles undergo nonreversible morphological transformations where density, color, and degree of oil absorbency can vary dependent upon the duration and residence time of thermal exposure.

Composition

Described herein are polymeric composition including a kaolin filler dispersed within a thermoplastic polymer. The kaolin filler can exhibit particular particle size characteristics—including a particle shape, an average particle size, and a particle size distribution—which provides filled polymeric composites having improved mechanical properties (e.g., improved flexural strength, improved tensile strength, improved heat deflection temperature, improved break stress, or a combination thereof).

In some embodiments, the kaolin filler can exhibit a ratio of aspect ratio to mean particle size, as measured by laser scattering, of at least 4 (e.g., at least 4.05, at least 4.1, at least 4.15, at least 4.2, at least 4.25, at least 4.3, at least 4.35, at least 4.4, at least 4.45, at least 4.5, at least 4.55, at least 4.6, at least 4.65, at least 4.7, at least 4.75, at least 4.8, at least 4.85, at least 4.9, or at least 4.95). In some embodiments, the kaolin filler can exhibit a ratio of aspect ratio to mean particle size, as measured by laser scattering, of 5 or less (e.g., 4.95 or less, 4.9 or less, 4.85 or less, 4.8 or less, 4.75 or less, 4.7 or less, 4.65 or less, 4.6 or less, 4.55 or less, 4.5 or less, 4.45 or less, 4.4 or less, 4.35 or less, 4.3 or less, 4.25 or less, 4.2 or less, 4.15 or less, 4.1 or less, or 4.05 or less).

The kaolin filler can exhibit a ratio of aspect ratio to mean particle size, as measured by laser scattering, ranging from any of the minimum values described above to any of the maximum values described above. For example, the kaolin filler can exhibit a ratio of aspect ratio to mean particle size, as measured by laser scattering, of from 4 to 5 (e.g., from 4.25 to 4.75, from 4.10 to 4.5, from 4.15 to 4.30, from 4.20 to 4.50, from 4.3 to 4.5, from 4.5 to 4.7, from 4.6 to 4.8, or from 4.7 to 4.9).

In some embodiments, the kaolin filler can exhibit a mean particle size of at least 0.75 microns e.s.d. (e.g., at least 0.8 microns e.s.d., at least 0.9 microns e.s.d., at least 1 micron e.s.d., at least 1.1 microns e.s.d., at least 1.2 microns e.s.d., at least 1.25 microns e.s.d., at least 1.3 microns e.s.d., at least 1.4 microns e.s.d., at least 1.5 microns e.s.d., at least 1.6 microns e.s.d., at least 1.7 microns e.s.d., at least 1.75 microns e.s.d., at least 1.8 microns e.s.d., or at least 1.9 microns e.s.d.), as measured by Sedigraph. In some embodiments, the kaolin filler can exhibit a mean particle size of 2 microns e.s.d. or less (e.g., 1.9 microns e.s.d. or less, 1.8 microns e.s.d. or less, 1.75 microns e.s.d. or less, 1.7 microns e.s.d. or less, 1.6 microns e.s.d. or less, 1.5 microns e.s.d. or less, 1.4 microns e.s.d. or less, 1.3 microns e.s.d. or less, 1.25 microns e.s.d. or less, 1.2 microns e.s.d. or less, 1.1 microns e.s.d. or less, 1 micron e.s.d. or less, 0.9 microns e.s.d. or less, or 0.8 microns e.s.d. or less), as measured by Sedigraph.

The kaolin filler can exhibit a mean particle size, as measured by Sedigraph, ranging from any of the minimum values described above to any of the maximum values described above. For example, the kaolin filler can exhibit a mean particle size of from 0.75 microns to 2 microns e.s.d. (e.g., from 1 micron to 1.5 microns e.s.d., or from 1.2 micron to 1.8 microns e.s.d.), as measured by Sedigraph.

In some embodiments, the kaolin filler can exhibit an aspect ratio of at least 20 (e.g., at least 25, at least 30, at least 35, at least 40, or at least 45), as measured by laser scattering. In some embodiments, the kaolin filler can exhibit an aspect ratio of 50 or less (e.g., 45 or less, 40 or less, 35 or less, 30 or less, or 25 or less), as measured by laser scattering.

The kaolin filler can exhibit an aspect ratio, as measured by laser scattering, ranging from any of the minimum values described above to any of the maximum values described above. For example, the kaolin filler can exhibit an aspect ratio of from 20 to 50 (e.g., from 20 to 30, from 30 to 40, or from 40 to 50), as measured by laser scattering.

In some embodiments, less than 30% by weight (e.g., less than 25% by weight, less than 20% by weight, less than 15% by weight, less than 10%, or less than 5% by weight) of the kaolin filler can exhibit a particle size of less than 0.5 microns e.s.d., as measured by Sedigraph.

In some embodiments, at least 50% by weight (e.g., at least 55% by weight, at least 60% by weight, at least 65% by weight, or at least 70% by weight) of the kaolin filler can have a particle size of within 25% (e.g., within 20%, within 15%, or within 10%) of the median particle size of the kaolin filler.

In some embodiments, at least 50% by volume (e.g., at least 55% by weight, at least 60% by weight, at least 65% by weight, or at least 70% by weight) of the kaolin filler can have a particle size of within 35% (e.g., within 30%, within 25%, within 20%, within 15%, or within 10%) of the median particle size of the kaolin filler.

In some embodiments, the kaolin filler can have an average circumference of less than 20 microns (e.g., less than 17 microns, less than 15 microns, or less than 10 microns), as measured by scanning electron microscope (SEM).

In some embodiments, the kaolin filler exhibits a mean radius diameter volume calculation measurement of from 50 $\mu m^3$ to 65 $\mu m^3$ for D10 and from 175 $\mu m^3$ to 200 $\mu m^3$ for D90, as determined using particle shape imaging analysis. In some embodiments, the kaolin filler exhibits a mean radius diameter volume calculation measurement of from 50 $\mu m^3$ to 65 $\mu m^3$ for D10 and from 200 $\mu m^3$ to 225 $\mu m^3$ for D90, as determined using particle shape imaging analysis. In some embodiments, 80% by weight (e.g., 85% by weight, or 90% by weight) of the kaolin filler exhibits a volume of from 50 $\mu m^3$ to 225 $\mu m^3$, as determined by particle shape imaging analysis. In some embodiments, 80% by weight (e.g., 85% by weight, or 90% by weight) of the kaolin filler exhibits a volume of from 50 $\mu m^3$ to 200 $\mu m^3$, as determined by particle shape imaging analysis.

If desired, the kaolin filler can be treated with a compatibilizer (e.g., to improve dispersion of the kaolin filler within the polymer matrix). In some examples, the compatibilizer can be a reactive silane (e.g., amino silane, a vinyl silane, an epoxy silane, a styryl silane, a methacryloxy silane, an acryloxy silane, a mercapto silane, or a combination thereof), a non-reactive silane (e.g., an alkyl silane, a phenyl silane, or a combination thereof), or a combination thereof. Compatibilizers such as calcium stearate, zinc stearate, stearic acid and other compatibilizers can be used to aid the dispersion of the clay in polymers. Samples with kaolin at loadings >40% can be treated with a compatibilizer like calcium stearate to aid in the incorporation of the mineral during twin screw extrusion. This can keep the pressures down during extrusion and improve dispersion of the clay in the polymer.

In some embodiments, the filler can be present in the composition in an amount of 5% by weight or more based on the total weight of the composition (e.g., 15% by weight or more, 20% by weight or more, 25% by weight or more, 30% by weight or more, 35% by weight or more, 40% by weight or more, 45% by weight or more, 50% by weight or more, 55% by weight or more, 60% by weight or more, or 65% by weight or more). In some embodiments, the composition can be present in the composition in an amount of less than 70% by weight based on the total weight of the composition (e.g., 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less).

The amount of filler present can range from any of the minimum values described above to any of the maximum values described above. For example, the filler can be present in the composition in an amount of from 5% by weight to 70% by weight, such as in an amount from 10% by weight to 65% by weight, from 20% by weight to 40% by weight, from 20% by weight to 30% by weight, from 30% by weight to 40% by weight, from 10% by weight to 50% by weight, from 10% by weight to 30% by weight, from 20% by weight to 50% by weight, from 30% by weight to 50% by weight, from 40% by weight to 50% by weight, from 20% by weight to 60% by weight, from 30% by weight to 60% by weight, from 40% by weight to 60% by weight, from 50% by weight to 60% by weight, from 20% by weight to 65% by weight, from 20% by weight to less than 70% by weight, or from 40% by weight to 65% by weight, based on the total weight of the composition.

In some embodiments, the polymer matrix can comprise a thermoplastic polymer, such as a polyolefin, a polystyrene, a polydiene, a styrene butadiene copolymer, a polyurethane, a polyester, a polycarbonate, a polyacrylonitrile, a polyamide, a styrenic block copolymer, an ethylene vinyl alcohol copolymer, an ethylene vinyl acetate copolymer, a polyester grafted with maleic anhydride, a polyvinylidene chloride, an aliphatic polyketone, liquid crystalline polymer, an ethylene methyl acrylate copolymer, an ethylene-norbornene copolymer, a polymethylpentene and ethylene acrylic acid copolymer, a blends thereof, or a copolymer thereof. In some embodiments, the polymer matrix can comprise a polyolefin, such as polypropylene, polyethylene, copolymers thereof, or blends thereof. In some embodiments, the polymer matrix can comprise a polyamide, such as nylon 6,6, nylon 6, copolymers thereof, or blends thereof. In some embodiments, the polymer matrix can comprise a rubber, such as an ethylene propylene diene monomer rubber.

In some embodiments wherein the polymeric matrix comprises a polyolefin (e.g., polypropylene), the composition can exhibit a tensile strength of 2000 psi or more, measured according to the standard method described in ASTM D638-14, (e.g., 2500 psi or more, 3000 psi or more, 3500 psi or more, 4000 psi or more, or 4500 psi or more). In some embodiments wherein the polymeric matrix comprises a polyolefin (e.g., polypropylene), the composition can exhibit a tensile strength of 5000 psi or less, measured according to the standard method described in ASTM D638-14, (e.g., 4500 psi or less, 4000 psi or less, 3500 psi or less, 3000 psi or less, or 2500 psi or less).

In some embodiments wherein the polymeric matrix comprises a polyolefin (e.g., polypropylene), the tensile strength of the composition can range from any of the minimum values described above to any of the maximum values described above. For example, the tensile strength of the composition can range from 2000 psi to less than 5000 psi, measured according to the standard method described in ASTM D638-14, (e.g., from 2000 psi to 4500 psi, from 2000 psi to 4000 psi, from 2000 psi to 3500 psi, from 2000 psi to 3000 psi, from 2000 psi to 2500 psi, from 2500 psi to 3000 psi, from 3000 psi to 5000 psi, from 3000 psi to 4000 psi, from 3000 psi to 3500 psi, from 3000 psi to less than 4500 psi, from 3500 psi to less than 4500 psi, or from 3500 psi to 4000 psi). In some embodiments wherein the polymeric matrix comprises a polyolefin (e.g., polypropylene), the tensile strength of a composition including about 40% by weight of a kaolin described herein can be greater than 4000 psi.

In some embodiments wherein the polymeric matrix comprises a polyolefin (e.g., polypropylene), the polymeric composition filled with a kaolin described herein can exhibit a break stress that is at least 5% (e.g., at least 10%, at least 15%, at least 20%, at least 25%, at least 30%, at least 35%, or at least 40%) greater than the break stress of an otherwise identical polymeric composition prepared with a conventional talc filler.

In some embodiments wherein the polymeric matrix comprises a polyolefin (e.g., polypropylene), the composition can exhibit a heat deflection temperature of 60° C. or more, measured according to the standard method described in ASTM D648-18 (e.g., 65° C. or more, 70° C. or more, 75° C. or more, 80° C. or more, or 85° C. or more, 90° C. or more, 95° C. or more). In some embodiments wherein the polymeric matrix comprises a polyolefin (e.g., polypropylene), the composition can exhibit a heat deflection temperature of 100° C. or less measured according to the standard method described in ASTM D648-18, (e.g., 95° C. or less, 90° C. or less, 85° C. or less, 80° C. or less, 75° C. or less, 70° C. or less, or 65° C. or less).

In some embodiments wherein the polymeric matrix comprises a polyolefin (e.g., polypropylene), the heat deflection temperature of the composition can range from any of the minimum values described above to any of the maximum values described above. For example, the heat deflection temperature of the composition can range from 60° C. to less than 100° C. measured according to the standard method described in ASTM D648-18, (e.g., from 60° C. to 90° C., from 60° C. to 95° C., from 60° C. to 85° C., from 60° C. to 80° C., from 60° C. to 75° C., from 60° C. to 70° C., from 60° C. to 65° C., from 65° C. to 75° C., from 65° C. to 80° C., from 65° C. to 75° C., from 65° C. to less than 90° C., from 70° C. to less than 90° C., from 70° C. to 85° C. from 70° C. to 80° C., from 70° C. to 75° C., or from 65° C. to 70° C.). In some embodiments wherein the polymeric matrix comprises a polyolefin (e.g., polypropylene), the heat deflection temperature of a composition including about 40% by weight of a kaolin described herein can be greater than 85° C.

In some embodiments wherein the polymeric matrix comprises a polyolefin (e.g., polypropylene), the polymeric composition filled with a kaolin described herein can exhibit a heat deflection temperature that is greater than the heat deflection temperature of an otherwise identical polymeric composition prepared with a conventional talc filler. In some embodiments wherein the polymeric matrix comprises a polyolefin (e.g., polypropylene), the polymeric composition filled with a kaolin described herein can exhibit a heat deflection temperature that greater than the heat deflection temperature of an otherwise identical polymeric composition prepared with a conventional anhydrous kaolin filler (e.g., kaolin available under the tradename ICEBERG® from Burgess Pigment).

In some embodiments wherein the polymeric matrix comprises a polyolefin (e.g., polypropylene), the composition can exhibit a flexural strength of 3500 psi or more measured according to the standard method described in ASTM D790-17, (e.g., 4000 psi or more, 4500 psi or more, or 5000 psi or more). In some embodiments wherein the polymeric matrix comprises a polyolefin (e.g., polypropylene), the composition can exhibit a flexural strength of 5500 psi or less measured according to the standard method described in ASTM D790-17, (e.g., 5000 psi or less, 4500 psi or less, 4000 psi or less).

In some embodiments wherein the polymeric matrix comprises a polyolefin (e.g., polypropylene), the flexural strength of the composition can range from any of the minimum values described above to any of the maximum values described above. For example, the flexural strength of the composition can range from 3500 psi to less than 5500 psi measured according to the standard method described in ASTM D790-17, (e.g., from 3500 psi to 5000 psi, from 4000 psi to 4500 psi, from 3500 psi to 4500 psi, from 3500 psi to 4000 psi, from 4000 to less than 5000 psi). In some embodiments wherein the polymeric matrix comprises a polyolefin (e.g., polypropylene), the flexural strength of a composition including about 40 wt % of a kaolin described herein can be greater than 5000 psi. In some embodiments wherein the polymeric matrix comprises a polyolefin (e.g., polypropylene), the polymeric composition filled with a kaolin described herein can exhibit a flexural strength that is at least 5% (e.g., at least 10%, or at least 15%) greater than the flexural strength of an otherwise identical polymeric composition prepared with a conventional talc filler.

In some embodiments wherein the polymeric matrix comprises a polyamide (e.g., nylon 6,6, nylon 6, copolymers thereof, or blends thereof), the composition can exhibit a tensile strength of 8000 psi or more, measured according to the standard method described in ASTM D638-14, (e.g., 8500 psi or more, 9000 psi or more, 9500 psi or more, 10000 psi or more, 10500 psi or more, 11000 psi or more, 11500 psi or more, 12000 psi or more, 12500 psi or more, 13000 psi or more, 13500 psi or more, 14000 psi or more, or 14500 psi or more). In some embodiments wherein the polymeric matrix comprises a polyamide (e.g., nylon 6,6, nylon 6, copolymers thereof, or blends thereof), the composition can exhibit a tensile strength of 15000 psi or less, measured according to the standard method described in ASTM D638-14, (e.g., 14500 psi or less, 14000 psi or less, 13500 psi or less, 13000 psi or less, 12500 psi or less, 12000 psi or less, 11500 psi or less, 11000 psi or less, 10500 psi or less, 10000 psi or less, 9500 psi or less, 9000 psi or less, or 8500 psi or less).

In some embodiments wherein the polymeric matrix comprises a polyamide (e.g., nylon 6,6, nylon 6, copolymers thereof, or blends thereof), the tensile strength of the composition can range from any of the minimum values described above to any of the maximum values described above. For example, the tensile strength of the composition can range from 8000 psi to less than 15000 psi, measured according to the standard method described in ASTM D638-14, (e.g., from 8000 psi to less than 14000 psi, from 8000 psi to less than 13000 psi, from 8000 psi to 11000 psi, from 8000 psi to 10000 psi, from 10000 psi to 15000 psi, from 10000 psi to 14000 psi, from 10000 psi to 13000 psi, or from 10000 psi to 12000 psi). In some embodiments wherein the polymeric matrix comprises a polyamide (e.g., nylon 6,6, nylon 6, copolymers thereof, or blends thereof), the tensile strength of a composition including about 40% by weight of a kaolin described herein can be greater than 10000 psi.

In some embodiments wherein the polymeric matrix comprises a polyamide (e.g., nylon 6,6, nylon 6, copolymers thereof, or blends thereof), the polymeric composition filled with a kaolin described herein can exhibit a break stress that is at least 5% (e.g., at least 10%, at least 15%, at least 20%, at least 25%, at least 30%, at least 35%, or at least 40%) greater than the break stress of an otherwise identical polymeric composition prepared with a conventional anhydrous kaolin filler.

In some embodiments wherein the polymeric matrix comprises a polyamide (e.g., nylon 6,6, nylon 6, copolymers thereof, or blends thereof), the composition can exhibit a heat deflection temperature of 80° C. or more, measured according to the standard method described in ASTM D648-18 (e.g., 85° C. or more, 90° C. or more, 95° C. or more, 100° C. or more, 105° C. or more, 110° C. or more, 115° C. or more, 120° C. or more, 125° C. or more, 130° C. or more, 135° C. or more, 140° C. or more, 145° C. or more, 150° C. or more, 155° C. or more, 160° C. or more, 165° C. or more, 170° C. or more, 175° C. or more, 180° C. or more, 185° C. or more, 190° C. or more, 195° C. or more, or 200° C. or more). In some embodiments wherein the polymeric matrix comprises a polyamide (e.g., nylon 6,6, nylon 6, copolymers thereof, or blends thereof), the composition can exhibit a heat deflection temperature of 200° C. or less measured according to the standard method described in ASTM D648-18, (e.g., 195° C. or less, 190° C. or less, 185° C. or less, 180° C. or less, 175° C. or less, 170° C. or less, 165° C. or less, 160° C. or less, 155° C. or less, 150° C. or less, 145° C. or less, 140° C. or less, 135° C. or less, 130° C. or less, 125° C. or less, 120° C. or less, 115° C. or less, 110° C. or less, 105° C. or less, 100° C. or less, 95° C. or less, 90° C. or less, or 85° C. or less).

In some embodiments wherein the polymeric matrix comprises a polyamide (e.g., nylon 6,6, nylon 6, copolymers thereof, or blends thereof), the heat deflection temperature of the composition can range from any of the minimum values described above to any of the maximum values described above. For example, the heat deflection temperature of the composition can range from 80° C. to less than 200° C. measured according to the standard method described in ASTM D648-18, (e.g., from 80° C. to 140° C., from 80° C. to 175° C., from 100° C. to 200° C., from 125° C. to 200° C., from 140° C. to 200° C., or from 160° C. to 200° C.). In some embodiments wherein the polymeric matrix comprises a polyamide (e.g., nylon 6,6, nylon 6, copolymers thereof, or blends thereof), the heat deflection temperature of a composition including about 40% by weight of a kaolin described herein can be greater than 125° C.

In some embodiments wherein the polymeric matrix comprises a polyamide (e.g., nylon 6,6, nylon 6, copolymers thereof, or blends thereof), the polymeric composition filled with a kaolin described herein can exhibit a heat deflection temperature that is at least 5% (e.g., at least 10%, or at least 15%) greater than the heat deflection temperature of an otherwise identical polymeric composition prepared with a conventional anhydrous kaolin filler.

In some embodiments wherein the polymeric matrix comprises a polyamide (e.g., nylon 6,6, nylon 6, copolymers thereof, or blends thereof), the composition can exhibit a flexural strength of 9500 psi or more measured according to the standard method described in ASTM D790-17, (e.g., 10000 psi or more, 10500 psi or more, 11000 psi or more, 11500 psi or more, 12000 psi or more, 12500 psi or more). In some embodiments wherein the polymeric matrix comprises a polyamide (e.g., nylon 6,6, nylon 6, copolymers thereof, or blends thereof), the composition can exhibit a flexural strength of 13000 psi or less measured according to the standard method described in ASTM D790-17, (e.g., 12500 psi or less, 12000 psi or less, 11500 psi or less, 11000 psi or less, 10500 psi or less, or 10000 psi or less).

In some embodiments wherein the polymeric matrix comprises a polyamide (e.g., nylon 6,6, nylon 6, copolymers thereof, or blends thereof), the flexural strength of the composition can range from any of the minimum values described above to any of the maximum values described above. For example, the flexural strength of the composition can range from 9500 psi to less than 12000 psi measured according to the standard method described in ASTM D790-17, (e.g., from 9500 psi to less than 11500, from 10000 psi to 11500 psi, or from 9500 psi to 11200 psi). In some embodiments wherein the polymeric matrix comprises a polyamide (e.g., nylon 6,6, nylon 6, copolymers thereof, or blends thereof), the flexural strength of a composition including about 40 wt % of a kaolin described herein can be greater than 10000 psi.

In some embodiments wherein the polymeric matrix comprises a polyamide (e.g., nylon 6,6, nylon 6, copolymers thereof, or blends thereof), the polymeric composition filled with a kaolin described herein can exhibit a flexural strength that is within 10% of the flexural strength of an otherwise identical polymeric composition prepared with a conventional talc filler (e.g., within 5% of the flexural strength, greater than the flexural strength, at least 5% greater than the flexural strength, at least 10% greater than the flexural strength, or at least 15% greater than the flexural strength). In some embodiments wherein the polymeric matrix comprises a polyamide (e.g., nylon 6,6, nylon 6, copolymers thereof, or blends thereof), the polymeric composition filled with a kaolin described herein can exhibit a flexural strength that is within 10% of the flexural strength of an otherwise identical polymeric composition prepared with a conventional anhydrous kaolin filler (e.g., ICEBERG available from Burgess Pigment) (e.g., within 5% of the flexural strength, greater than the flexural strength, at least 5% greater than the flexural strength, at least 10% greater than the flexural strength, or at least 15% greater than the flexural strength).

Methods of Making

As discussed above, the kaolins described herein can be incorporated in polymers (e.g., to polyamides, polyolefins, and rubber) to improve the mechanical properties of the polymers (e.g., to improve rigidity and processability).

Accordingly, also provided herein are methods of making filled polymeric composition. These methods can comprise dispersing a kaolin filler described herein within a polymer matrix. In some embodiments, dispersing the kaolin filler within the polymer matrix can include coextruding the kaolin filler and a polymer.

In some embodiments, the method further includes processing the composition to form an article from the composition. While in heat plastified condition, compositions can be processed into a desired shape, and subsequently cooled to set the shape. Such shapes can include, but are not limited to, a fiber, filament, film, sheet, rod, tube, bottle, or other shape. Such processing can be performed using any art-known technique, such as, but not limited to, extrusion, injection molding, compression molding, blowing or blow molding (e.g., blown film, blowing of foam), calendering, rotational molding, casting (e.g., cast sheet, cast film), or thermoforming.

The compositions described herein can be used to create, without limitation, a wide variety of useful products, e.g., automotive, consumer disposable, consumer durable, construction, electrical, medical, and packaging products. For instance, the blends can be used to make, without limitation, films (e.g., packaging films, agricultural film, mulch film, erosion control, hay bale wrap, slit film, food wrap, pallet wrap, protective automobile and appliance wrap, etc.), golf tees, caps and closures, agricultural supports and stakes, paper and board coatings (e.g., for cups, plates, boxes, etc.), thermoformed products (e.g., trays, containers, yoghurt pots, cup lids, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g., diapers, feminine hygiene products, incontinence products, disposable wipes, padding, etc.), coatings for pelleted products (e.g., pelleted fertilizer, herbicides, pesticides, seeds, etc.

By way of example, in some embodiments, the compositions described herein can be formed into highly filled polyolefin pellets. The pellets can include a polyolefin (e.g., polypropylene), stabilizers, lubricants, and the kaolin. The target loading of the kaolin in the polypropylene can be >50% by weight. The compounding step can be performed by adding the kaolin and other additives to the resin in compounding equipment that heats the material by mechanical energy generated by turning screws and heaters arranged along the barrel of the compounder. This step mixes the kaolin, polyolefin (e.g., polypropylene, polyethylene), and other additives in the molten state. This mixture, while molten, is forced through a die where it is cooled forming a strand of compound. This strand is then cut into smaller particles that are typically cylindrical in shape between $\frac{1}{16}$ to $\frac{1}{2}$ inch in length.

In this example the compound described above is mixed with virgin resin, in this example polypropylene to produce the desired loading of kaolin. The loading level is decided by the desired ultimate product requirements. To increase rigidity the loading is increased if the product exceeds the rigidity requirements the loading is reduced to maintain an economical performance vs cost balance. The blend of virgin resin and compound containing the kaolin is then fed into the barrel of an extruder. The material is gradually melted by the mechanical energy generated by turning screws and heaters arranged along the barrel. The molten polymer is then forced into a die, which shapes the polymer into a sheet or film that hardens during cooling. The sheet or film now contains the desired quantity of kaolin completely dispersed through the sheet or film.

There are two general thermoforming process categories. Sheet thickness less than 1.5 mm (0.060 inches) is usually delivered to the thermoforming machine from rolls or from a sheet extruder. Thin-gauge roll-fed or inline extruded thermoforming applications are dominated by rigid or semi-rigid disposable packaging. Sheet thicknesses greater than 3 mm (0.120 inches) are usually delivered to the forming machine by hand or an auto-feed method already cut to final dimensions. Heavy, or thick-gauge, cut sheet thermoforming applications are primarily used as permanent structural components. There is a small but growing medium-gauge market that forms sheet 1.5 mm to 3 mm in thickness.

Heavy-gauge forming utilizes the same basic process as continuous thin-gauge sheet forming, typically draping the heated plastic sheet over a mold. Many heavy-gauge forming applications use vacuum only in the form process, although some use two halves of mating form tooling and include air pressure to help form. Aircraft windscreens and machine gun turret windows spurred the advance of heavy-gauge forming technology during World War II. Heavy-gauge parts are used as cosmetic surfaces on permanent structures such as kiosks, automobiles, trucks, medical equipment, material handling equipment, refrigerators, spas, and shower enclosures, and electrical and electronic equipment. Unlike most thin-gauge thermoformed parts, heavy-gauge parts are often hand-worked after forming for trimming to final shape or for additional drilling, cutting, or finishing, depending on the product. Heavy-gauge products typically are of a "permanent" end use nature, while thin-gauge parts are more often designed to be disposable or recyclable and are primarily used to package or contain a food item or product. Heavy-gauge thermoforming is typically used for production quantities of 250 to 3000 annually, with lower tooling costs and faster product development than competing plastic technologies like injection molding.

As can be seen in the applications described above physical properties of filled polymeric composites are extremely important. The mechanical and electrical properties can be enhanced by incorporating a kaolin described herein in many polymers and thermosets (e.g., cured rubber). The kaolins described herein can also reduce the moisture vapor transmission rate through polymer films, as they produce a tortuous path which beneficial to prevent moisture and gasses from passing through films.

Reference will now be made in detail to specific aspects of the disclosed materials, compounds, compositions, articles, and methods, examples of which are illustrated in the accompanying Examples and Figures.

By way of non-limiting illustration, examples of certain embodiments of the present disclosure are given below.

EXAMPLES

General Materials

Kaolin 1 was a delaminated, fine particle size, medium brightness hydrous kaolin clay. Kaolin 1 was prepared by a delamination process using a large particle size feed clay.

Kaolin 1 was spray dried and then milled to a minimum of a HEGMAN 4. The resulting material exhibited the following particle size characteristics:

1. The ratio of aspect ratio to mean particle size, as measured by laser scattering (e.g., using a Horiba laser particle size analyzer), was from 4-5 (e.g., from 4.25-4.75).
2. The material exhibited a particle size distribution that lacked fines as compared to typical kaolin materials. For example, in some embodiments, little to no fines peak was visible laser scattering data (e.g., collected using a Horiba laser particle size analyzer). Less than 30% by weight of the kaolin filler exhibited a particle size of less than 0.5 microns e.s.d., as measured by Sedigraph.
3. The D50 particle size, as measured by Sedigraph, was 0.75-2 microns e.s.d. (e.g., from 1-1.5 microns e.s.d.).
4. The aspect ratio was from 20-50 (e.g., from 30-40) as measured by laser scattering (e.g., using a Horiba laser particle size analyzer).
5. The average circumference, as measured by SEM, was less than 20 microns (e.g., less than 17 microns).
6. The mean radius diameter volume calculation measurement, obtained using the Particle Shape Imaging Analysis, demonstrated that the D10 was above 50 $\mu m^3$ (e.g., within 10% of 50 $\mu m^3$) and the D90 was below 220 $\mu^3$ (e.g., within 10% of 200 $\mu m^3$).

Calcined Clay:

Kaolin 1 was calcined in a muffle furnace at 850° C. for 1.25 hours to afford Kaolin 2. This calcination temperature was low enough to maintain the particle structure and shape (aspect ratio) while driving the LOI to <1% from a starting point of approximately 14%.

Silane Treatment:

Calcined and hydrous kaolin clays can be silane treated. Silanes react onto the surface of the clay and when the proper silane is used the other functional end can react into the polymer. This is the case for both the Kaolin 3 and the Kaolin 4. Kaolin 3 was a sample of Kaolin 2 treated with a reactive amino silane compatibilizer. Kaolin 4 was reacted with appropriate functionalized silanes.

However, it is well known that there are many silanes that can be used on calcined and hydrous clays. The loading levels for these silanes can be between 0.1% to 3%. In some cases, a monolayer of silane can be disposed on the surface of the clays.

The kaolins used in these examples are summarized in the table below.

| Kaolin 1 | Hydrous | Delaminated kaolin |
|---|---|---|
| Kaolin 2 | Anhydrous Kaolin 1 | Calcined Delaminated kaolin |
| Kaolin 3 | Kaolin 2 that is aminosilane treated | Amino-Silane Treated Calcined Delaminated Kaolin |
| Kaolin 4 | Kaolin 2 that is vinyl silane treated | Vinyl-Silane Treated Calcined Delaminated Kaolin |

Talc 1 (used as a control) is a conventional talc commonly used as a filler in polymers to improve dimensional stability. Talc 1 had a median particle size of 3.8 microns as measured by Sedigraph, a GE Brightness of 95 (CIE Lab), and an oil absorption of 30 (as measured by ASTM D281-12 (2016)).

BURGESS 2211 (used as a control) was a recognized standard clay in the polyamide industry. BURGESS 2211 had a nominal 1.5 micron amino-silane treated clay. It is does not meet the particle size/shape criteria of Kaolin 1-Kaolin 4.

Polypropylene having a melt flow index of 12 g/10 min (measured according to ASTM D1238-13 entitled "Standard Test Method for Melt Flow Rates of Thermoplastics by Extrusion Plastometer") sold under the tradename PRO-FAX® 6331 (commercially available from LyondellBasell) was used for the preparation of polypropylene composites. Nylon 6,6 having a melt flow index of 26 g/10 min sold under the tradename ZYTEL® 101 (commercially available from DuPont) was used for the preparation of polyamide composites.

General Methods

Kaolin-filled composite materials were prepared by co-extruding a kaolin and a thermoplastic polymer at various weight ratios. A Leistritz twin screw co-rotating extruder was used for compounding the kaolin and the thermoplastic polymer. A Cincinnati Milacron 85-ton press was then used to inject molded bars.

Following molding, the mechanical properties of the molded composites were measured. The heat deflection of molded composites was measured using a Tinius Olsen according to the standard method described in ASTM D648-18, entitled "Standard Test Method for Deflection Temperature of Plastics Under Flexural Load in the Edgewise Position," which is incorporated herein by reference in its entirety. Three samples of each composite were tested with the results averaged. The flexural strength of the molded composites was tested using an Alpha Technologies instrument according to the standard method described in ASTM D790-17 entitled "Standard Test Methods for Flexural Properties of Unreinforced and Reinforced Plastics and Electrical Insulating Materials," which is incorporated herein by reference in its entirety. Five samples of each composite were tested and averaged. The tensile strength of the molded composites was tested using an Alpha Technologies instrument according to the standard method described in ASTM D638-14 entitled "Standard Test Method for Tensile Properties of Plastics," which is incorporated herein by reference in its entirety. Five samples of each composite were tested and averaged. The tensile strength of polyolefin and rubber samples was tested using an Alpha Technologies instrument according to the standard method described in ASTM D412-16 entitled "Standard Test Methods for Vulcanized Rubber and Thermoplastic Elastomers-Tension," which is incorporated herein by reference in its entirety. Notched izod impact tests were performed using a Tinius Olsen according to the standard method described in ASTM D256-10(2018) entitled "Standard Test Methods for Determining the Izod Pendulum Impact Resistance of Plastics," which is incorporated herein by reference in its entirety. 6-12 bars were tested and the results were averaged. The test bars were ashed and specific gravity was measured to validate mineral loading levels.

Example 1: Use of Delaminated, High Aspect Ratio Kaolin Clay as a Filler in Polypropylene Composites were prepared by dispersing various weight ratios of Kaolin 1 in polypropylene having a melt flow index of 12 g/10 min as described above. Briefly, Kaolin 1 was added into polypropylene using the twin screw extruder. Operating temps were between 357° F. and 455° F. The RPMs were varied as needed between 300-500 rpm. The feed rates on the feeders were set so the total weight of compound was 20 lbs/hour, but the Kaolin feeder and the polypropylene feeder were varied to produce the desired filler loading in the final compound. The material was then injection molded to form the various test pieces.

Figure 2:
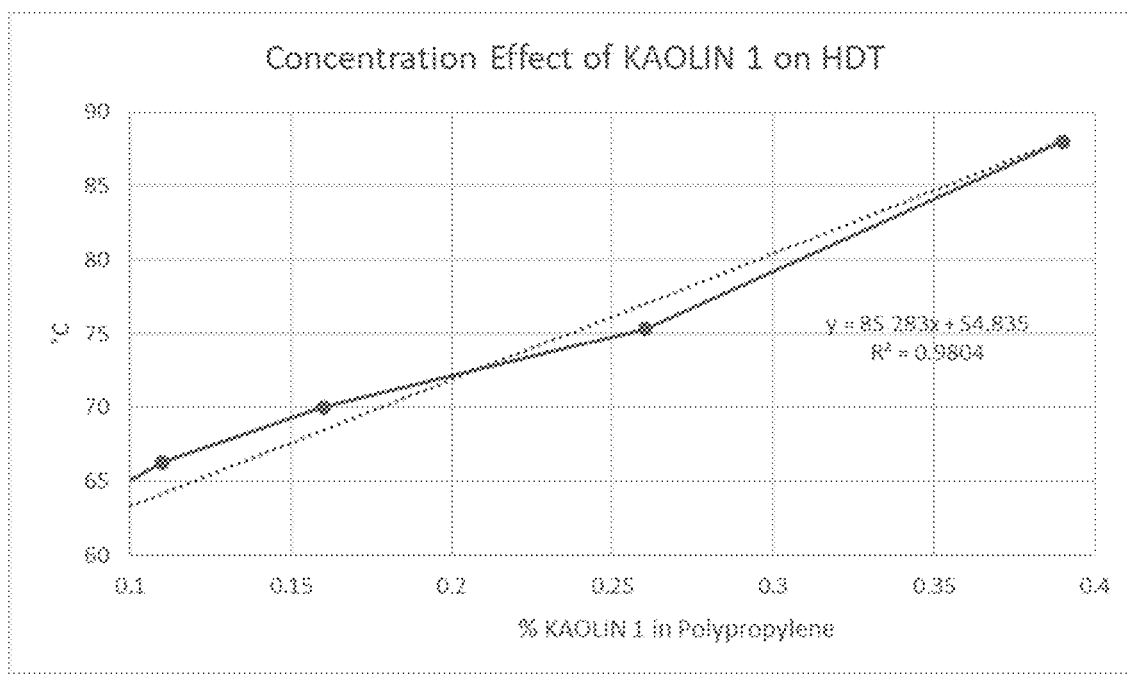
FIG. 2 is a line graph showing the increase heat deflection temperature improvements with increasing Kaolin 1 concentrations (10%, 15%, 25%, and 40%).

The heat deflection temperature (HDT) of the resulting composites was then evaluated. As shown in FIG. 1, Kaolin 1 provided nearly equivalent and consistent HDT performance in polypropylene (PP) at the same loading level as talc. Further, HDT increased as the loading of Kaolin 1 in the composite was increased from 10% by weight to 40% by weight. See FIG. 2.

Figure 3:
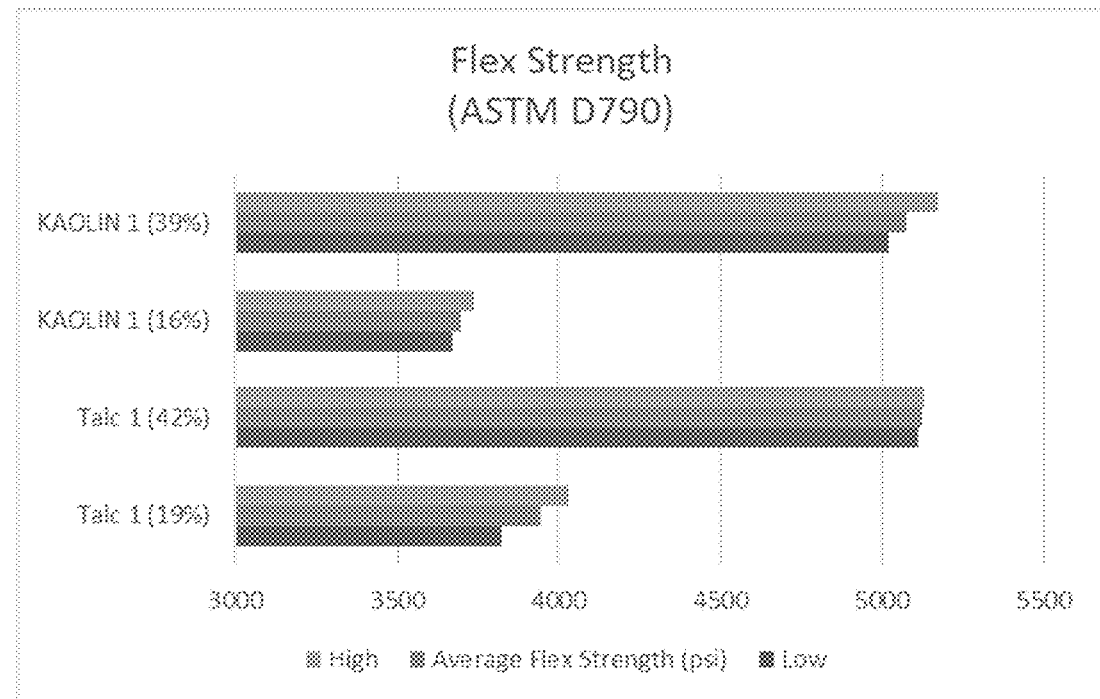
FIG. 3 is a bar graph comparing flex strength (psi) for Kaolin 1 and talc at different concentrations.
Figure 4:
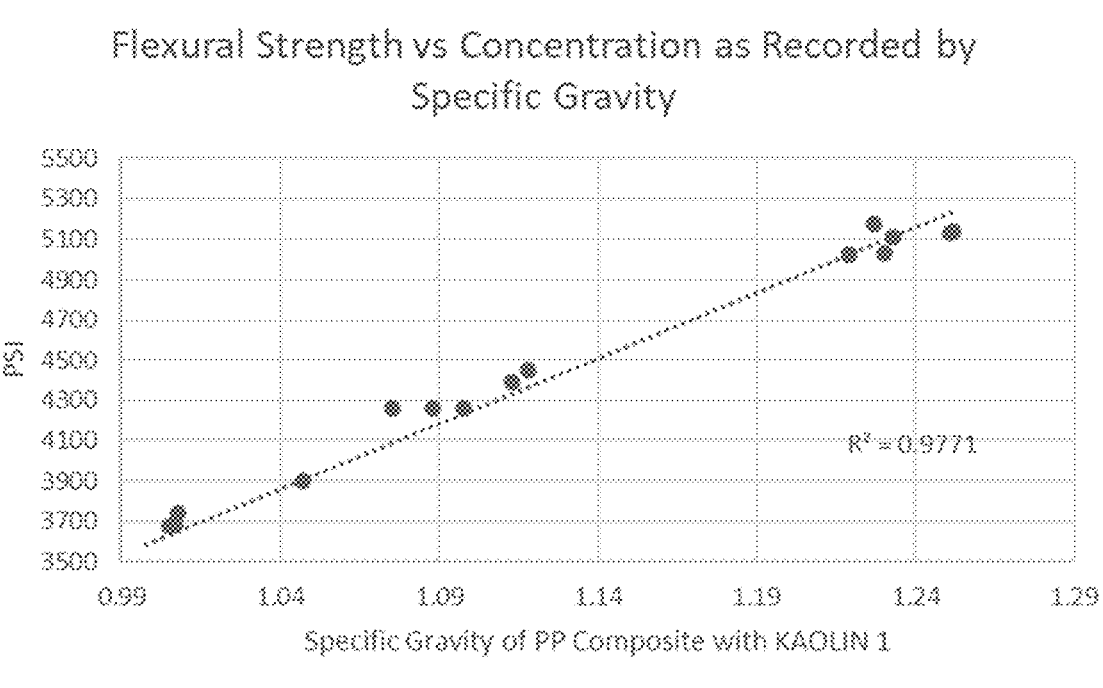
FIG. 4 is a line graph showing the correlation between Kaolin 1 concentration in polypropylene as measured by specific gravity and flexural strength in polypropylene.

The flexural strength of the composites was also evaluated. As shown in FIG. 3, polypropylene composites prepared with Kaolin 1 exhibited similar stiffness to composites prepared with talc. The flexural strength of the composites decreased as the concentration of Kaolin 1 in the composites decreased. See FIG. 4.

Figure 5:
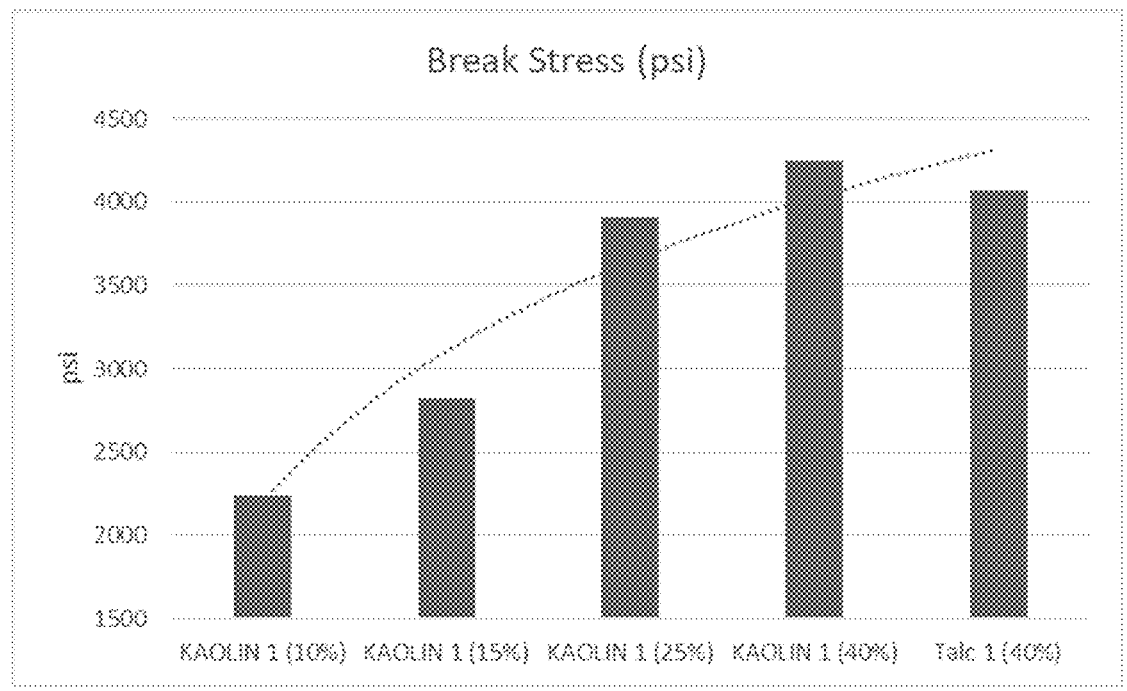
FIG. 5 is a bar graph comparing the tensile strength of Kaolin 1 and talc in polypropylene at different concentration.

The flexural strength of the composites was also evaluated. As shown in FIG. 5, tensile strength results show that Kaolin 1 offers a good balance of properties in polypropylene. The break stress of polypropylene was slightly increased with an equivalent loading of Kaolin 1 compared to a commercial talc. Furthermore, additional Kaolin 1 did not significantly increase the break strength.

These finding suggest that Kaolin 1 can be used to prepare composites having a better suite of mechanical properties than composites prepared from talc (the conventionally used filler for such composites).

Example 2: Delaminated, High Aspect Ratio Kaolin Clay Filled Polyamide

Kaolin 2 was treated with an amino silane like 3-aminopropyltriethoxy silane at levels around 1% to afford Kaolin 3. The amino silane could be substituted for other types of silanes that would be functionally active with polyamides.

Composites were prepared by dispersing various weight ratios of Kaolin 3 in nylon 6-6 having a melt flow index of 26 g/10 min as described above. Briefly, these materials were then, separately added to the polyamide-6,6 via the twin screw extruder. The extruder was operated at temperature ranges from 490-567° F. The feed rates on the feeders were set so the total weight of compound was 20 lbs/hour, but the kaolin feeder and the polypropylene feeder were varied to produce the desired filler loading in the final compound. The material was then injection molded to form the various test pieces.

Figure 6:
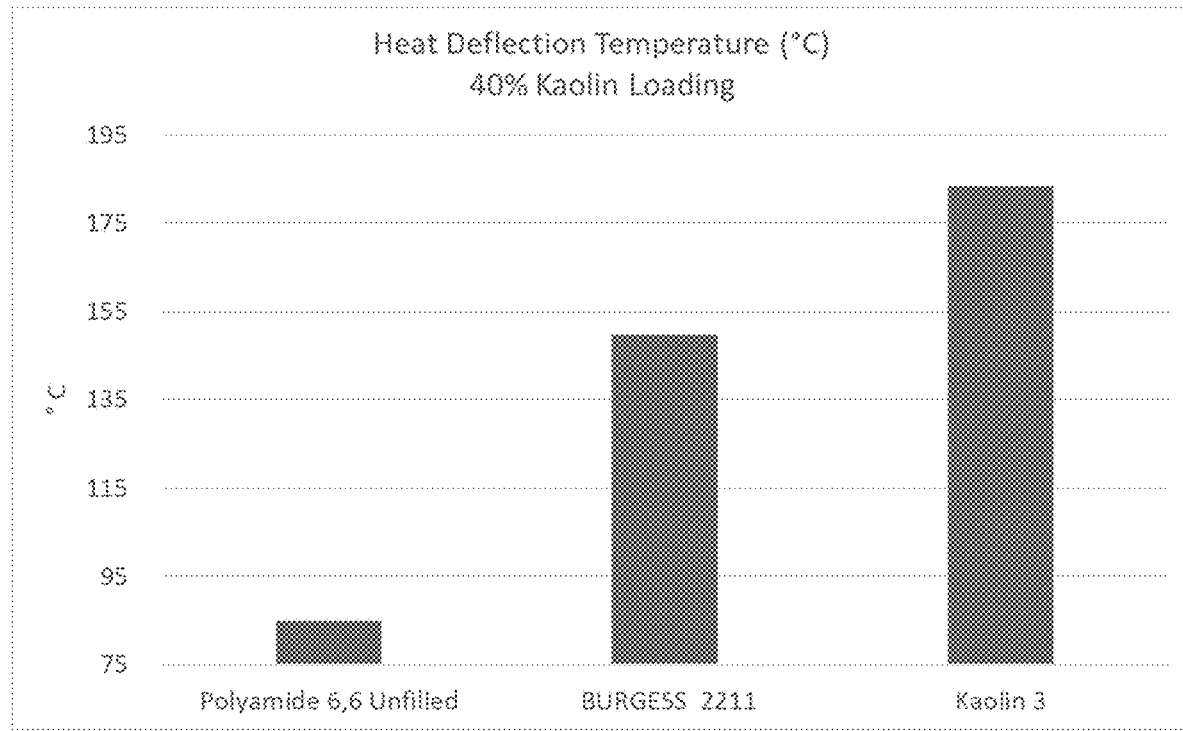
FIG. 6 is a bar graph comparing the heat deflection temperature of unfilled polyamide 6,6, 40 wt % BURGESS 2211 in polyamide 6,6, and 40 wt % Kaolin 3 in polyamide 6,6.
Figure 7:
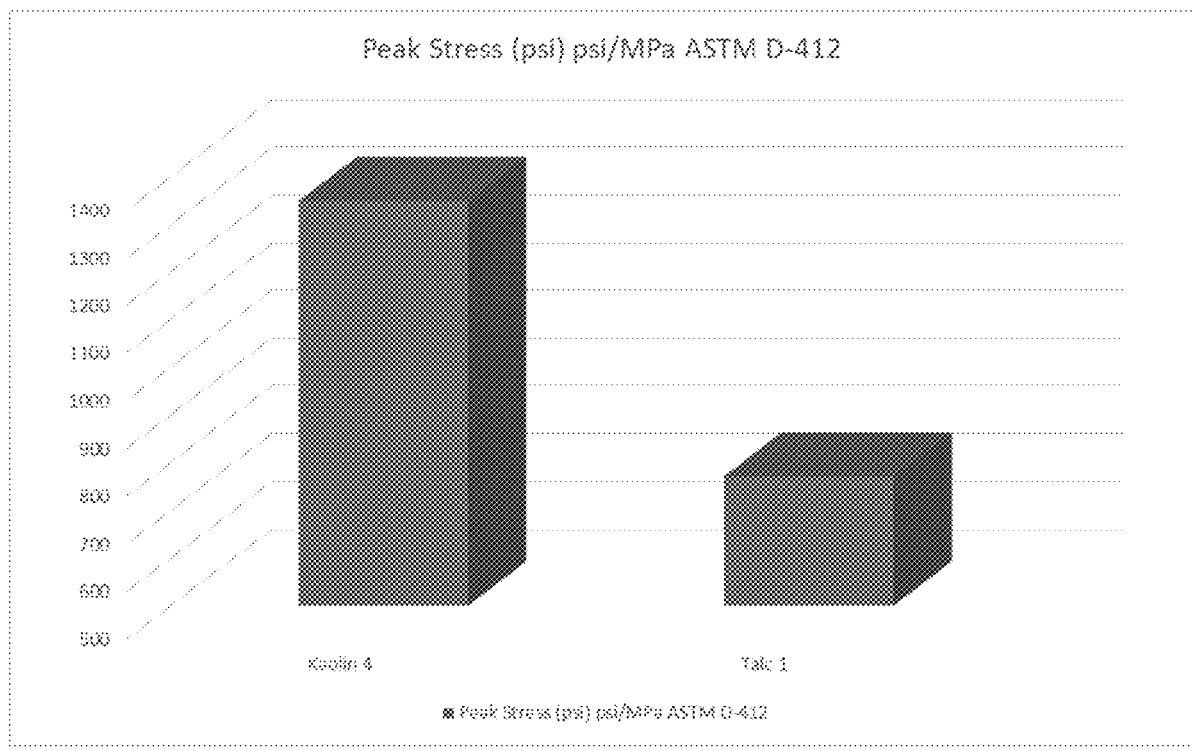
FIG. 7 is a bar graph comparing the peak stress for a rubber composition filled with Talc 1 and Kaolin 4 (reactive functionalized vinyl silane).
Figure 8:
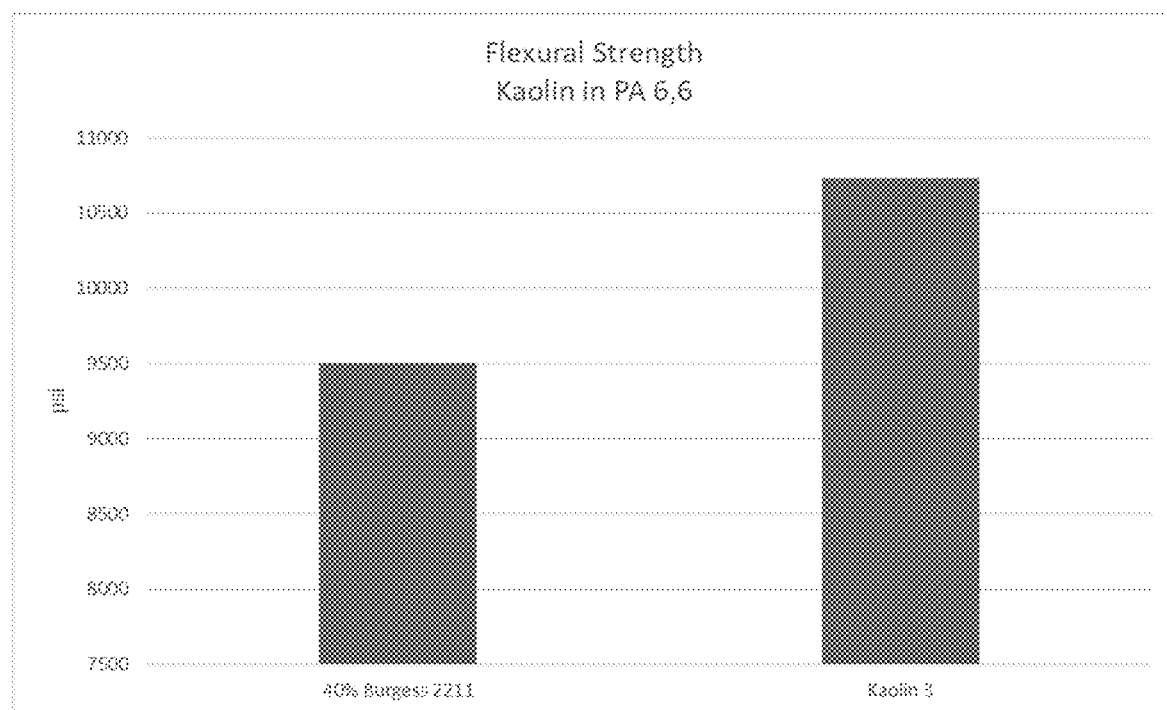
FIG. 8 is a bar graph of the flexural strength of treated calcined Kaolin in polyamide 6,6 compared to Kaolin 3 in polyamide 6,6.

As demonstrated in FIGS. 6 and 8, composites prepared with Kaolin 3 exhibited superior heat deflection temperatures as compared to BURGESS 2211 and other treated calcined kaolin commonly used in industry. FIG. 6 shows that heat deflection temperature is increased by at least 25% compared to the current kaolin clays used in the industry. FIG. 8 shows that flexural strength is also increased by more than 10% compared to the current kaolin clays used in the industry at a 40% loading.

These finding suggest that Kaolin 3 can be used to prepare composites having a better properties than composites prepared from treated calcined kaolin or BURGUESS 2211 (the conventionally used filler for such composites).

Example 3: Delaminated, High Aspect Ratio Kaolin Clay Filled Rubber

Composites were prepared by dispersing various weight ratios of Kaolin 4 in a basic medium voltage rubber. The composite included ethylene propylene diene terpolymer rubber (EPDM 2504 rubber), zinc oxide, polymerized 1,2-dihydro-2,2,4-trimethylquinoline (Agerite MA), red lead, and Kaolin 4. Once the ingredients were weighed, they were mixed in a Banbury mixer. The ethylene propylene diene terpolymer rubber was added and mixed until the drop temperature was reached. Next the remaining ingredients were fed one by one with Kaolin 4 being last the ingredients added. During mixing the ram was lifted and swept several times to ensure all ingredients were mixed well. When the temperature reached 370° F., the material was dropped into a pan and placed on the two-roll mill to be sheeted out and allowed to rest for 24 hours. Two roll mill temperatures were set at 1 80° F. on the back roll and 1 90° F. on the front roll. After 24 hours of rest the peroxide cure was added via the 2-roll mill at the same roll temps stated above. The milled sample was removed from the mill at 85 mil thickness.

Figure 9:
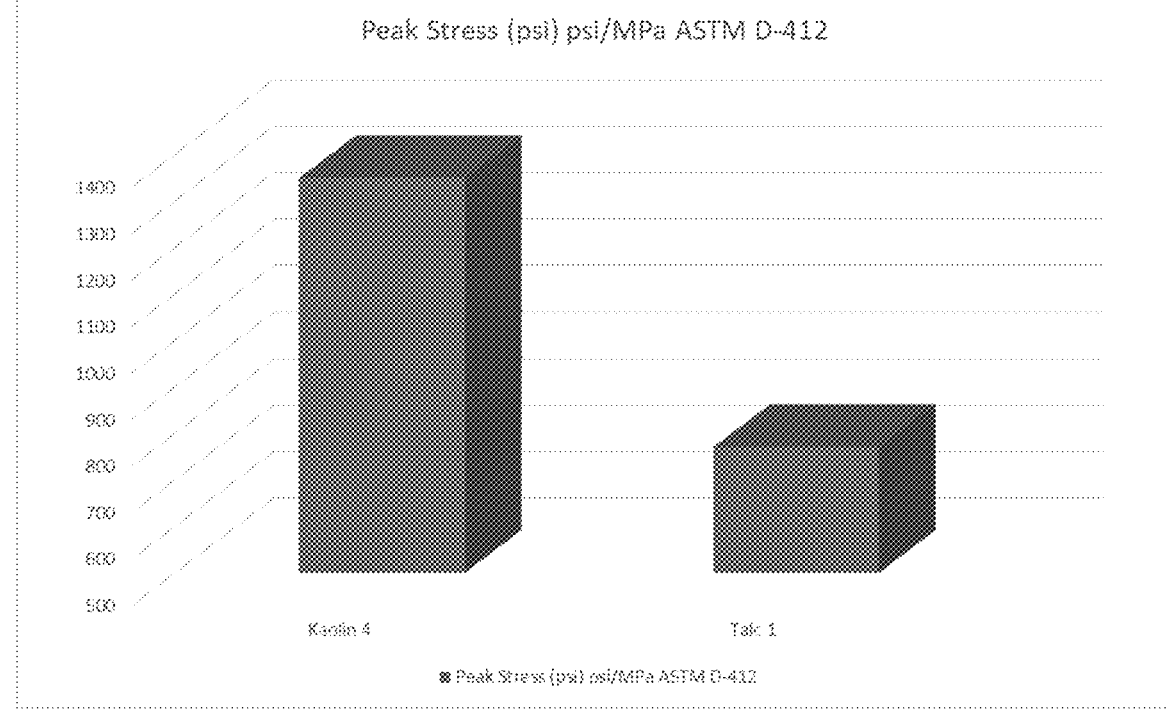
FIG. 9 is a bar graph of the peak stress of treated calcined Kaolin in polyamide 6,6 compared to Kaolin 4 in polyamide 6,6.

Once the peroxide cure was added to the compound it was rested again for 24 hours. Next the samples were cut of the milled sheet 5¾"×5¾" and placed in a 75 mil thick platen press and cured in the Wabash press using the RUBBER profile setup; 350° F. for 15 minutes at 15 tons clamp pressure then cooled to 130° F. After all samples were molded and rested for 24 hours physical properties were tested. Kaolin 4 dramatically improved the break stress by 50%. See FIG. 9.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A polymeric composition comprising a kaolin filler dispersed within a polymer matrix;
   wherein the kaolin filler exhibits an aspect ratio of from 20 to 50, as measured by laser scattering;
   wherein the kaolin filler exhibits a mean particle size of from 0.75 microns to 2 microns e.s.d., as measured by Sedigraph;
   wherein less than 30% by weight of the kaolin filler exhibits a particle size of less than 0.5 microns e.s.d., as measured by Sedigraph;

and wherein the kaolin filler comprises a delaminated kaolin filler.

2. The composition of claim 1, wherein the ratio of aspect ratio to mean particle size, as measured by laser scattering ranges from 4 to 5.

3. The composition of claim 1, wherein the kaolin filler has an aspect ratio of from 20 to 40, as measured by laser scattering.

4. The composition of claim 1, wherein the kaolin filler exhibits a median particle size of from 1 micron to 1.8 microns e.s.d., as measured by Sedigraph.

5. The composition of claim 1, wherein less than 20% by weight of the kaolin filler exhibits a particle size of less than 0.5 microns e.s.d., as measured by Sedigraph.

6. The composition of claim 1, wherein the kaolin filler has an average circumference of less than 20 microns, as measured by scanning electron microscope (SEM).

7. The composition of claim 1, wherein the kaolin filler exhibits a mean radius diameter volume calculation measurement of from 50 $\mu m^3$ to 65 $\mu m^3$ for D10 and from 175 $\mu m^3$ to 200 $\mu m^3$ for D90, as determined using particle shape imaging analysis.

8. The composition of claim 1, wherein 80% by weight of the kaolin filler exhibits a volume of from 50 $\mu m^3$ to 225 $\mu m^3$, as determined by particle shape imaging analysis.

9. The composition of claim 1, wherein the kaolin filler has been treated with a compatibilizer.

10. The composition of claim 9, wherein the compatibilizer comprises a reactive silane, such as an amino silane, a vinyl silane, an epoxy silane, a mercapto silane, or a combination thereof.

11. The composition of claim 1, wherein the filler is present in the composition in an amount of from 5% by weight to 70% by weight, based on the total weight of the composition.

12. The composition of claim 1, wherein the polymer matrix comprises a thermoplastic selected from the group consisting of polyolefins, polystyrene, polydienes, styrene butadiene copolymers, polyurethanes, polyesters, polycarbonate, polyacrylonitriles, polyamides, styrenic block copolymers, ethylene vinyl alcohol copolymers, ethylene vinyl acetate copolymers, polyesters grafted with maleic anhydride, polyvinylidene chloride, aliphatic polyketone, liquid crystalline polymers, ethylene methyl acrylate copolymer, ethylenenorbornene copolymers, polymethylpentene and ethylene acrylic acid copolymer, or blends thereof, and copolymers thereof.

13. The composition of claim 12, wherein the polymer matrix comprises a polyolefin.

14. The composition of claim 13, wherein the composition exhibits a tensile strength of from 2000 psi to 5000 psi measured according to the standard method described in ASTM D638-14;
a heat deflection temperature of from 60° C. to 100° C. measured according to the standard method described in ASTM D648-18;
a flexural strength of from 3500 psi to less than 5500 psi measured according to the standard method described in ASTM D790-17;
or any combination thereof.

15. The composition of claim 12, wherein the polymer matrix comprises a polyamide.

16. The composition of claim 15, wherein the composition exhibits a tensile strength of from 8000 psi to 15000 psi measured according to the standard method described in ASTM D638-14;
a heat deflection temperature of from 80° C. to 200° C. measured according to the standard method described in ASTM D648-18;
a flexural strength of from 9500 psi to less than 12000 psi measured according to the standard method described in ASTM D790-17;
or any combination thereof.

17. The composition of claim 12, wherein the polymer matrix comprises a rubber.

18. A method of making a polymeric composition comprising a kaolin filler dispersed within a polymer matrix, the method comprising:
dispersing a kaolin filler within a polymer matrix, wherein the kaolin filler exhibits an aspect ratio of from 20 to 50, as measured by laser scattering;
wherein the kaolin filler exhibits a mean particle size of from 0.75 microns to 2 microns e.s.d., as measured by Sedigraph; and
wherein less than 25% by weight of the kaolin filler exhibits a particle size of less than 0.5 microns e.s.d., as measured by Sedigraph.

19. The method of claim 18, wherein dispersing the kaolin filler within the thermoplastic polymer matrix comprises coextruding the kaolin filler and the thermoplastic polymer.

20. The method of claim 18, further comprising forming an article from the polymeric composition.

21. The method of claim 20, wherein forming the article comprises a melt-processing technique selected from the group consisting of extrusion, compression molding, blow molding, injection molding, and injection blow molding.

22. The method of claim 21, wherein forming the article comprises thermoforming.

23. An article formed from the composition of claim 1.

24. The article of claim 23, wherein the article is selected from the group consisting of a cup, plate, bowl, platter, bottle, container, lid, tray, blister, clamshell, bag, and sleeve, or a combination thereof.

* * * * *